United States Patent [19]

Takei et al.

[11] Patent Number: 4,887,686
[45] Date of Patent: Dec. 19, 1989

[54] WORKING VEHICLE

[75] Inventors: Terutaka Takei; Shigeru Morita; Hiroaki Kawakita, all of Osaka, Japan

[73] Assignee: Kubota ltd., Osaka, Japan

[21] Appl. No.: 183,700

[22] Filed: Apr. 14, 1988

[30] Foreign Application Priority Data

Apr. 15, 1987 [JP] Japan .................................. 62-93727
Apr. 15, 1987 [JP] Japan .................................. 62-58113
May 22, 1987 [JP] Japan ................................ 62-126118

[51] Int. Cl.$^4$ .............................................. B62D 11/04
[52] U.S. Cl. .................... 180/211; 180/212; 180/215; 180/233; 180/237; 180/252
[58] Field of Search ............... 180/233, 247, 248, 249, 180/21, 211, 212, 215, 237, 75.1, 252

[56] References Cited

U.S. PATENT DOCUMENTS

| | | | |
|---|---|---|---|
| 2,376,419 | 5/1945 | Cole | 180/211 |
| 3,901,339 | 8/1975 | Williamson | 180/21 |
| 4,157,125 | 6/1979 | Bushell et al. | 180/212 |
| 4,313,295 | 2/1982 | Hansen et al. | |
| 4,369,855 | 1/1983 | Buschbom et al. | 180/212 |
| 4,520,903 | 6/1985 | Arnold et al. | 180/211 |
| 4,538,700 | 9/1985 | Suzuki | 180/248 |
| 4,792,009 | 12/1988 | Iritani | 180/233 |

Primary Examiner—Charles A. Marmor
Assistant Examiner—Donn McGiehan
Attorney, Agent, or Firm—Birch, Stewart, Kolasch & Birch

[57] ABSTRACT

A working vehicle comprising a vehicle body having a pair of front wheels and a pair of rear wheels, at least the rear wheels being drivingly rotatable and steerable, a working machine provided at the front end of the vehicle body, and a steering wheel and a seat which are disposed in the vicinity of the front wheels at the front portion of the body. The rear wheels can be steered between a forwardly directed position and a laterally directed position about a vertical axis approximately at the midportion between the pair of front wheels. The vehicle can make a quick turn with a small radius without subjecting the operator to a great centrifugal force.

31 Claims, 15 Drawing Sheets

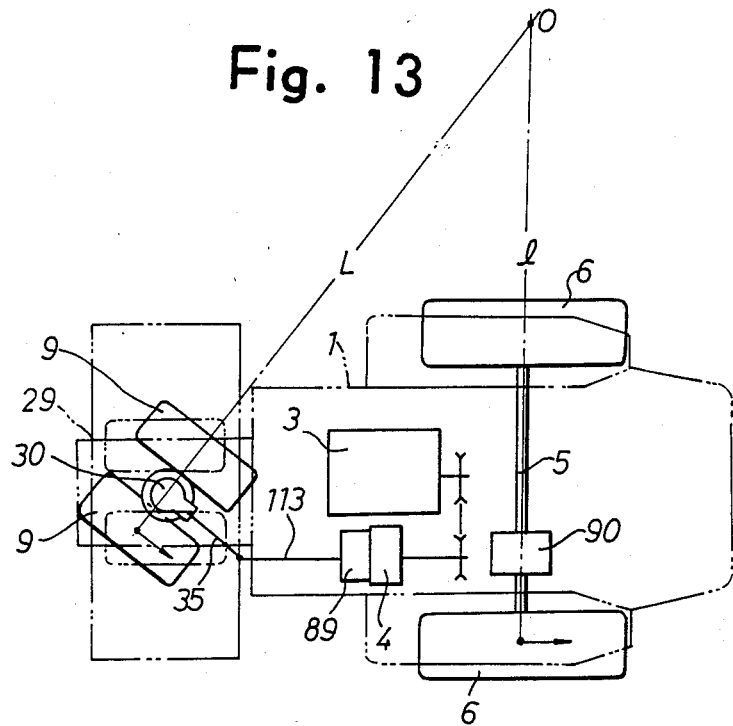
Fig. 13
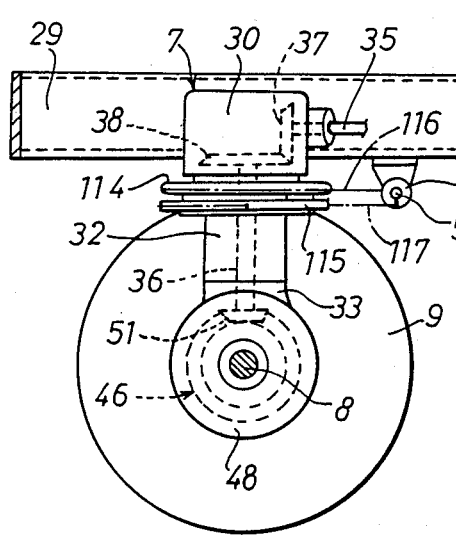
Fig. 14
Fig. 15

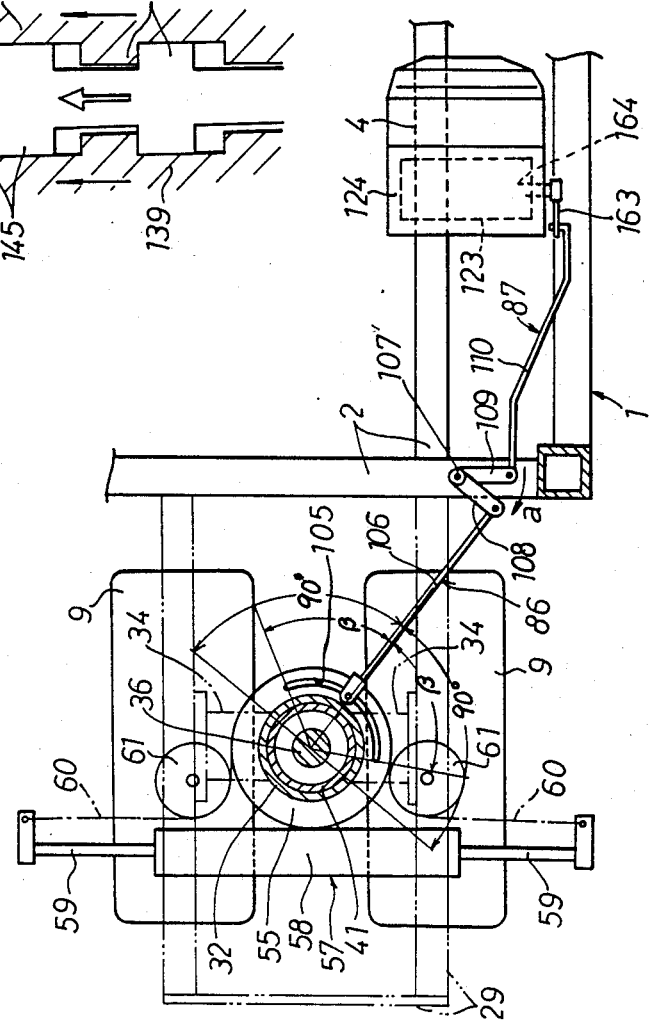

Fig. 21
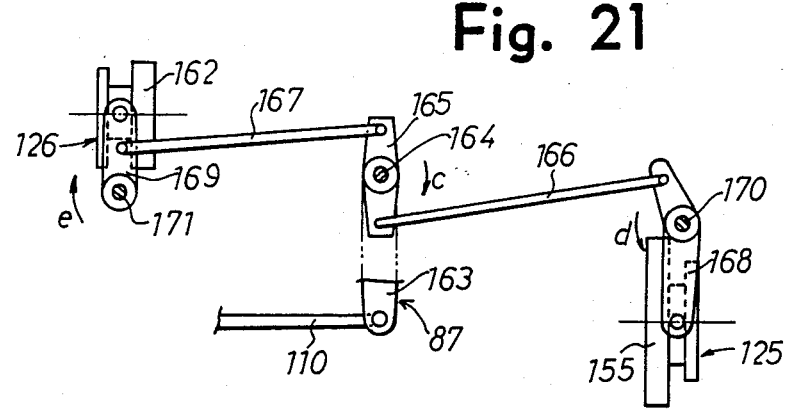
Fig. 22
Fig. 23
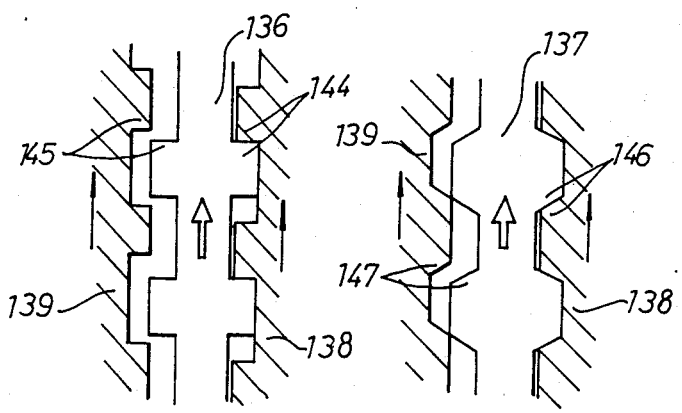
Fig. 24
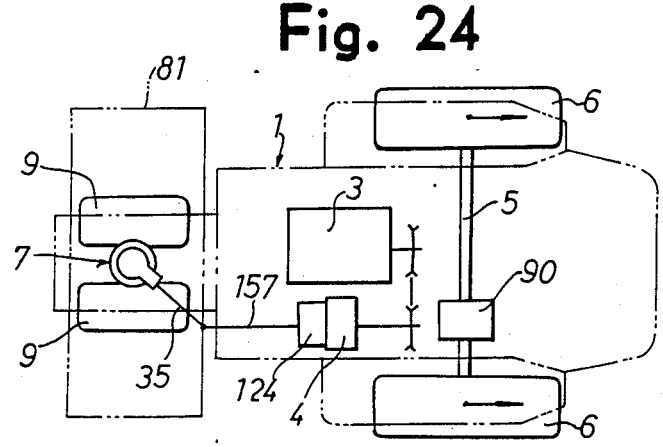

WORKING VEHICLE

FIELD OF THE INVENTION AND RELATED ART STATEMENT

The present invention relates to working vehicles having a working machine at the front end of the vehicle body.

Working vehicles are known which comprise a vehicle body having a pair of front wheels and a pair of rear wheels, steering means including a steering wheel, operator's seat, etc. and mounted on the vehicle body, and a working machine provided at the front end of the body. Of the front and rear wheels, at least the rear wheels are drivingly rotatable and serving as steering wheels. These working vehicles include, for example, riding mowers which comprise a mower assembly attached to the front end of the vehicle body and which are adapted to cut grass while being steered by the operator in the seat on the vehicle body.

Such riding mowers generally have a so-called Ackermann steering system wherein a pair of rear wheels are movable each about a kingpin for steering. Accordingly, even if the front wheel is freely rotatable, the rear wheel has a large turning radius because the steering angle thereof is limited, making it difficult for the mower to cut grass around trees or shrubs. Further when the operator, conventionally seated in the central portion between the front and rear wheels, steers the rear wheels to make a quick turn with a small turning radius, the operator is subjected to a great centrifugal force, which renders his steering posture unstable, posing a problem in respect of safety.

Futher when the mower is of the four-wheel drive type with the front and rear wheels serving as drive wheels, the rear wheels slip during turning by an amount corresponding to the difference in the turning radius between the front and rear wheels, acting to brake the front wheels to give a further increased turning radius and cause damage to grass or vegetation owing to slippage.

In order to absorb the difference in turning radius between the front and rear wheels during turning and preclude the slippage of the rear wheels, it is proposed to incorporate in the power transmission system for the rear wheels a manual clutch, which is operated during turning to interrupt the power transmission to the rear wheels, or to incorporate in the rear wheel power transmission system a one-way clutch which is adapted to be automatically disengaged during turning.

However, the former manual clutch, when used, needs to be manipulated by the operator for every turn, hence the drawback of extreme cumbersomeness.

The mower having the latter one-way clutch is turnable free of trouble during forward running, whereas during reverse travel, the one-way clutch does not function, permitting the mower to turn with the front and rear wheels driven and resulting in a large turning radius and the drawback of causing damage to grass or the like.

OBJECTS AND SUMMARY OF THE INVENTION

The present invention has been accomplished in order to overcome the foregoing problems heretofore encountered.

A first object of the invention is to assure the rear wheels, serving as drive wheels, of a sufficient steering angle to permit a quick turn with a reduced turning radius.

A second object of the invention is to provide a working vehicle which is turnable approximately about its steering means to make a quick turn with a small turning radius without subjecting the operator to a great centrifugal force.

A third object of the invention is to provide a working vehicle which has front and rear four wheels serving as drive wheels and which is automatically adapted to be driven by only two rear wheels when making turns to preclude the rear wheels from slipping owing to the difference in turning radius between the front and rear wheels, permitting the vehicle to make quick turns with a decreased turning radius without causing damage to grass or the like.

A fourth object of the invention is to provide a working vehicle which is smoothly turnable during forward or reverse travel as driven by its front wheels at all times and which is further adapted to be driven by front and rear four wheels when the front wheels slightly slip.

To fulfill these first to fourth objects, the present invention provides the following means.

First, the invention provides a working vehicle comprising a vehicle body 1 having a pair of front wheels 6 and a pair of rear wheels 9, steering means 65, 68 mounted on the vehicle body, and a working machine 71 provided at the front end of the vehicle body, at least the rear wheels 9 of the four wheels 6, 9 being drivingly rotatable and serviceable as steering wheels, the steering means 65, 68 being disposed in the vicinity of the front wheels 6 at the front portion of the vehicle body 1, the rear wheels 9 being steerable between a forwardly directed position and a laterally directed position about a vertical axis approximately at the midportion between the pair of rear wheels 9.

Second, the invention provides a working vehicle comprising a vehicle body 1 having a pair of front wheels 6 and a pair of rear wheels 9, steering means 65, 68 mounted on the vehicle body 1, and a working machine 71 provided at the front end of the vehicle body 1, the front wheels 6 and the rear wheels 9 being drivingly rotatable, the rear wheels 9 being steerable, the steering means 65, 68 being disposed in the vicinity of the front wheels 6 at the front portion of the vehicle body 1, the vehicle further comprising a clutch 85 incorporated in a power transmission system for the front wheels 6, means 86 for detecting the steering angle of the rear wheels 9, and coupling means 87 movable with the detecting means 86 to disengage the clutch 85 when the steering angle of the rear wheels 9 exceeds a predetermined angle $\alpha$.

Third, the invention provides a working vehicle comprising a vehicle body 1 having a pair of front wheels 6 and a pair of rear wheels 9, steering means 65, 68 mounted on the vehicle body 1, and a working machine 71 provided at the front end of the vehicle body 1, the front wheels 6 and the rear wheels 9 being drivingly rotable, the rear wheels 9 being steerable, the steering means 65, 68 being disposed in the vicinity of the front wheels 6 at the front portion of the vehicle body 1, the vehicle further comprising a front wheel power transmission system 120 and a rear wheel power transmission system 121 for transmitting power to the front wheels 6 and the rear wheels 9, respectively, so as to give a higher peripheral speed to the front wheels 6 than to the rear wheels 9, the power transmission systems 120, 121 being operatively connected to a prime mover 3 via a no-spin differential 122.

BRIEF DESCRIPTION OF THE DRAWINGS

FIG. 1 is a plan view partly broken away and showing the embodiment in its entirety;

FIG. 2 is a side elevation of the same;

FIG. 3 is a front view in section of the same;

FIG. 4 is a side elevation in section of a rear wheel power transmission system;

FIG. 5 is a sectional view of a rear wheel drive assembly;

FIG. 6 is a diagram for illustrating operation;

FIGS. 7 to 13 show a second embodiment of the invention;

FIG. 7 is a plan view partly broken away and showing the second embodiment in its entirety;

FIG. 8 is a side elevation of the same;

FIG. 9 is a plan view in section of the same;

FIG. 10 is a sectional view of a reduction assembly;

FIG. 11 is a plan view in section of steering angle detecting means;

FIG. 12 is a sectional view of a rear wheel drive assembly;

FIG. 13 is a diagram for illustrating operation;

FIGS. 14 and 15 show a third embodiment of the invention;

FIG. 14 is a side elevation showing a rear wheel steering assembly;

FIG. 15 is a perspective view of a steering mechanism;

FIGS. 16 to 27 show a fourth embodiment of the invention;

FIG. 16 is a plan view in section of a steering angle detecting means;

FIG. 17 is a sectiona view of a power transmission;

FIG. 18 is a sectional view of a no-spin differential;

FIG. 19 is a development showing meshing portions of a drive ring and clutch rings;

FIG. 20 is a development showing meshing portions of a cam ring and the clutch rings;

FIG. 21 is a side elevation showing coupling means;

FIGS. 22 and 23 are diagrams for illustrating the operation of the no-spin differential; and FIGS. 24 to 27 are diagrams for illustrating operation.

DESCRIPTION OF THE PREFERRED EMBODIMENTS

The present invention will be described below in detail with reference to the illustrated preferred embodiments.

FIGS. 1 to 6 show a first embodiment of the invention.

Figure 1:
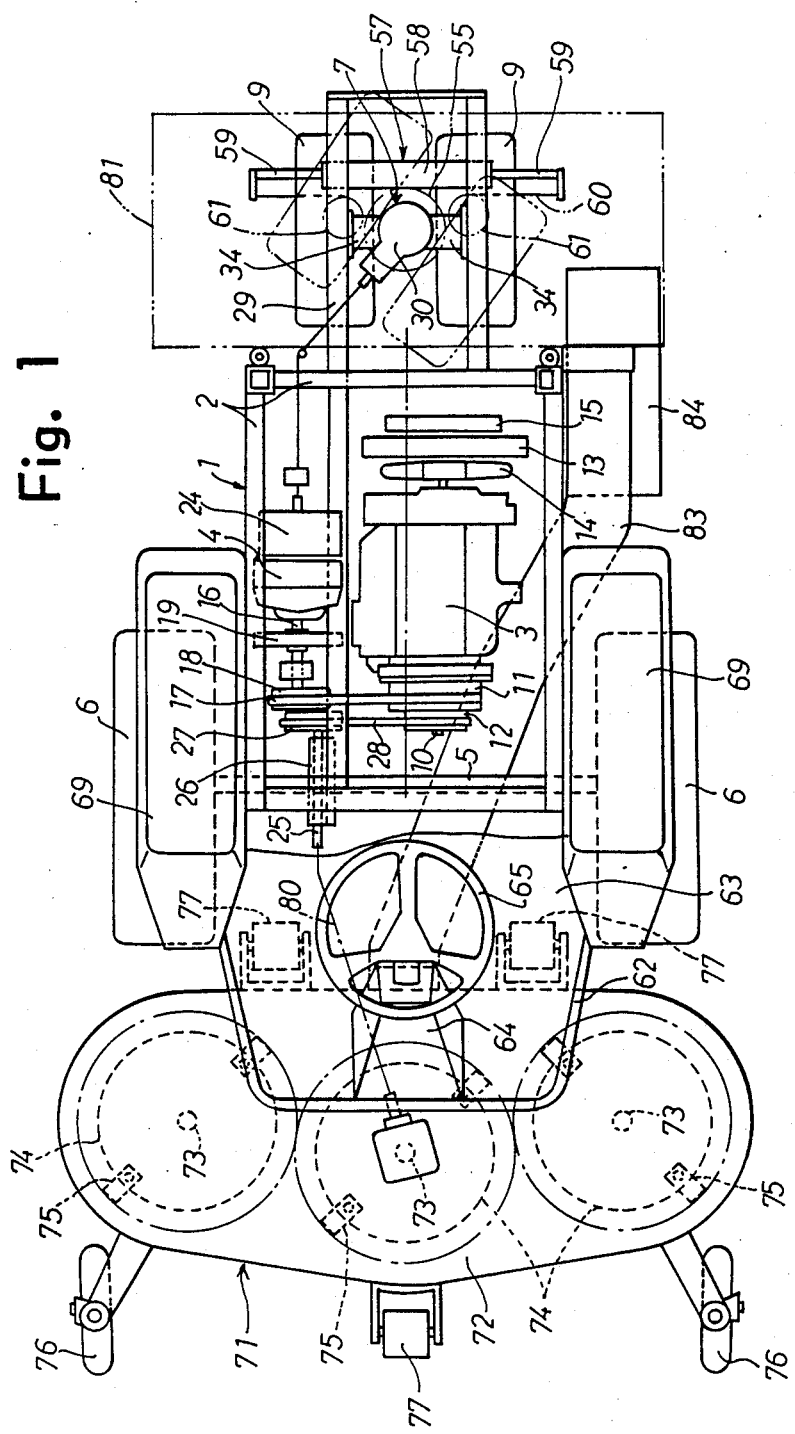
FIGS. 1 to 6 show a first embodiment of the invention.
Figure 2:
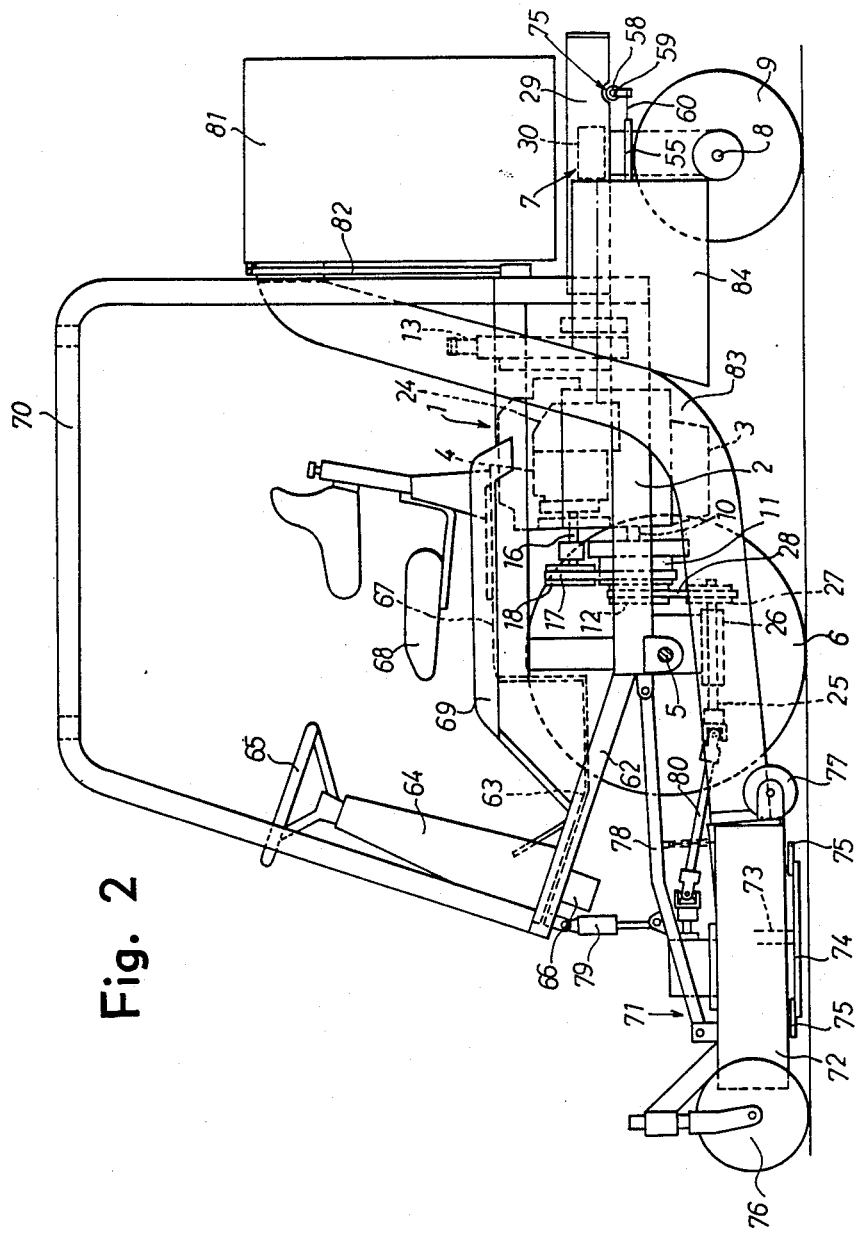
Figure 3:
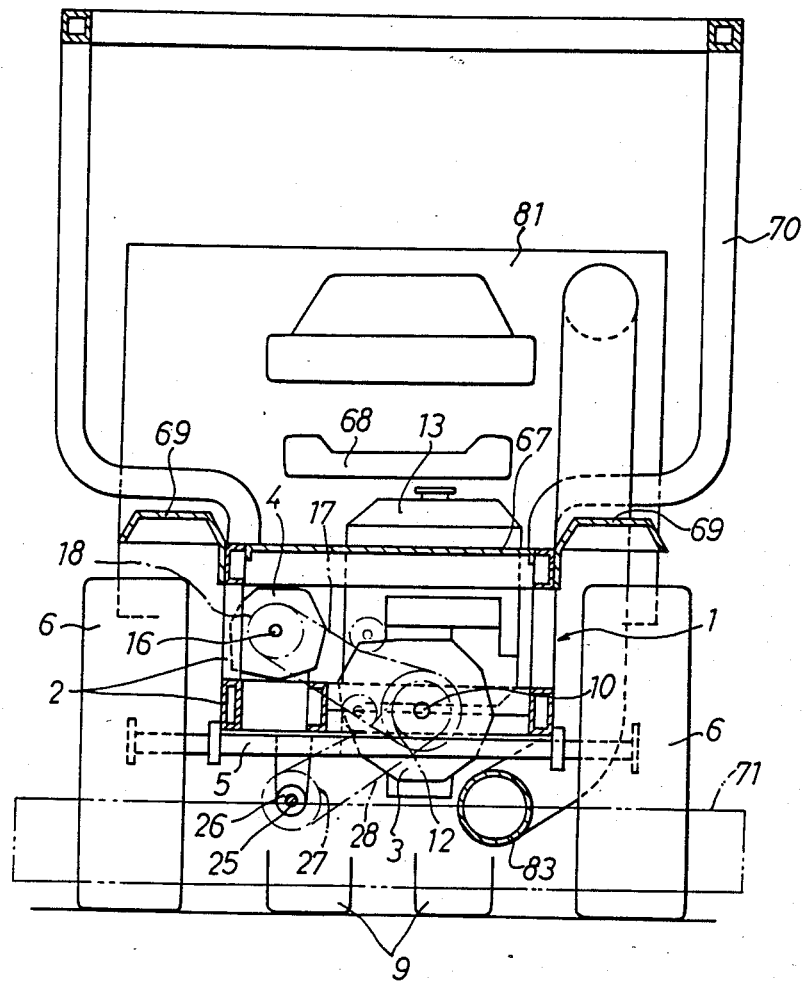

Referring to FIGS. 1 to 3, a vehicle body 1 is in the form of a rectangular frame assembled of members 2, such as tubular members of square cross section. The vehicle body 1 is provided with an engine 3 and a hydrostatic speed change unit 4 arranged side by side widthwise of the body and mounted on its lengthwise midportion, a pair of large front wheels 6 freely rotatably supported by a front axle 5 at its front portion, and a pair of small rear wheels 9 supported at its rear portion by rear axles 8 included in a rear wheel drive assembly 7. The engine 3 is mounted on the vehicle body 1 with a vibration preventing member interposed therebetween. A crankshaft 10 forwardly extending from the engine 3 carries thereon a drive pulley 11 and a PTO pulley 12. Arranged in the rear of the engine 3 are a radiator 13, a cooling fan 14 and an oil cooler 15.

The speed change unit 4 is mounted on the vehicle body 1 with a vibration preventing member provided therebetween. Mounted on an input shaft 16 projecting forward from the unit 4 are a pulley 18 coupled to the drive pulley 11 on the crankshaft 10 by a belt 17, and a cooling fan 19 for applying air to the unit 4.

Figure 4:
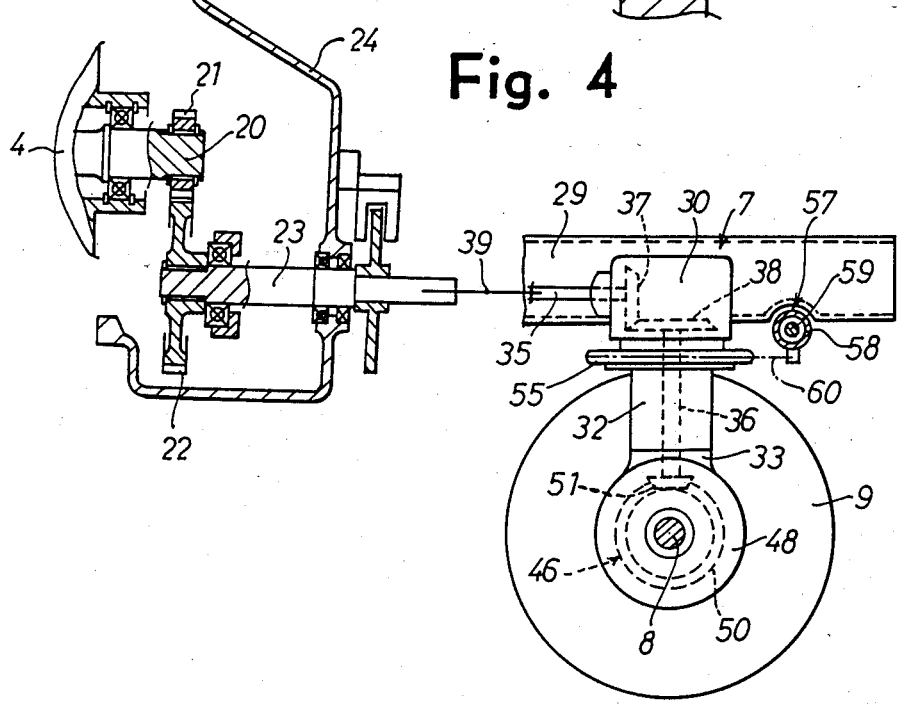

As shown in FIG. 4, the speed change unit 4 is provided on its rear side with a transmission case 24 having a transmission shaft 23 which is coupled to an output shaft 20 of the unit 4 by gears 21, 22. The transmission shaft 23 is in parallel to the output shaft 20 and extends rearward from the case 24.

A front PTO shaft 25 is rotatably supported by a bearing case 26 on the front end lower portion of the vehicle body 1 so as to be positioned in front of the speed change unit 4 and below the front axle 5. The PTO shaft 25 is coupled to the PTO pulley 12 by a pulley 27 and a belt 28.

Figure 5:
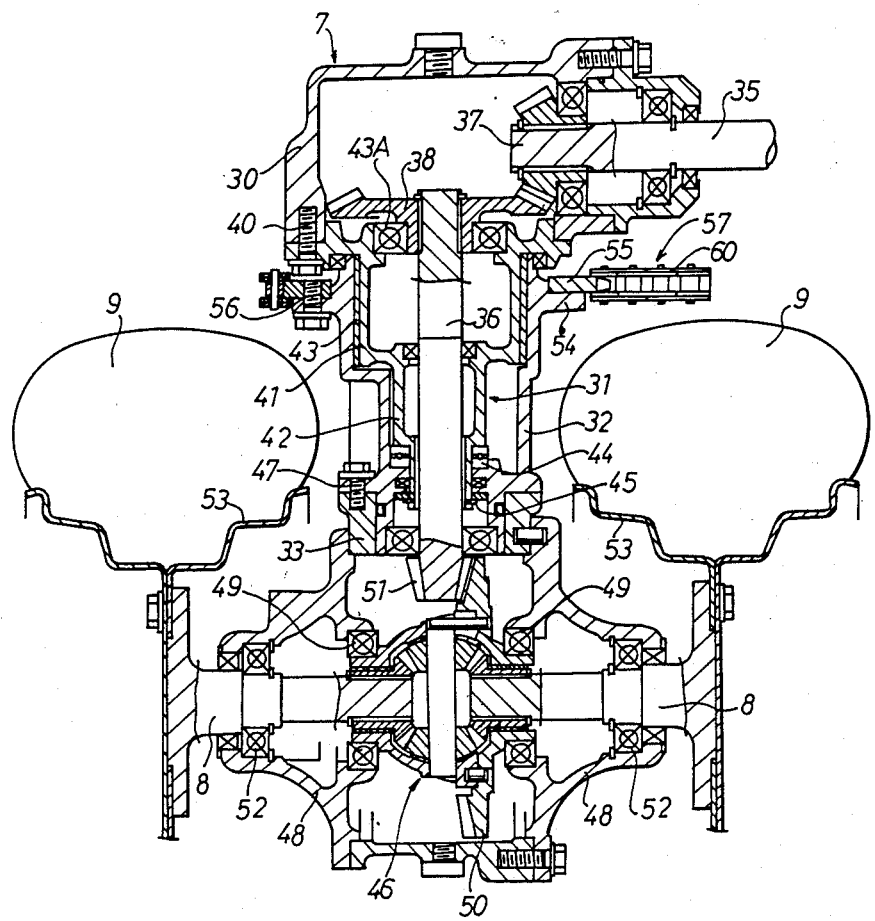

The rear wheel drive assembly 7 is supported by a rear frame 29 projecting rearward from the rear end of the vehicle body 1. As shown in FIGS. 4 and 5, the drive assembly 7 comprises a gear transmission housed in an upper case 30, inner cylinder 31, outer cylinder 32 and lower case 33. As seen in FIG. 1, the upper case 30 is attached to the rear frame 29 by a pair of opposed bracket portions 34. As shown in FIGS. 4 and 5, the upper case 30 has assembled therewith an input shaft 35, bevel pinion shaft 36 and bevel gears 37, 38 coupling these shafts together. The input shaft 35 is projected forward from the upper case 30 obliquely sidewise and connected at its front end to the transmission shaft 23 by a universal joint 39.

With reference to FIG. 5, the bevel pinion shaft 36 extends vertically. The inner cylinder 31 is fastened to the lower end of the upper case 30 by bolts 40 so as to extend downward therefrom concentrically with the bevel pinion shaft 36. The inner cylinder 31 comprises a diametrically large upper portion 41 and a diametrically small lower portion 42. The bevel gear 38 is rotatably supported by a bearing 43A on the upper end of the large portion 41. The outer cylinder 32 is rotatably fitted around the inner cylinder 31 with a bush 43, a bearing 44, etc. provided therebetween and prevented from downwardly slipping off the inner cylinder 31 by a retaining ring 45 at the lower end of the cylinder 31. The lower case 33, which is adapted to support a rear wheel differential gear 46, is fastened to the lower end of the outer cylinder 32 by bolts 47. Rear axle cases 48 are bolted to the respective sides of the lower case 33. The rear wheel differential gear 46 is supported by bearings 49 on the axle cases 48 and has a bevel gear 50 meshing with a bevel pinion 51 at the lower end of the bevel pinion shaft 36. The rear axles 8, projecting from the differential gear 46 toward opposite sides, are supported by bearings 52 on the respective axle cases 48. The rear wheel 9 is attached to the outer end of each axle 8. The rear wheels 9 are disposed close to the lower case 33 so that the rear axle cases 48 are positioned generally inside the respective tire rims 53. The tread between the pair of rear wheels 9 is about ⅓ of the tread between the pair of front wheels 6.

With reference to FIGS. 4 and 5, the outer cylinder 32 is provided with a steering sprocket 55 supported by a flange 54 projecting from the cylinder 32 and positioned above the rear wheels 9. The sprocket 55 comprises circumferentially divided two segments removably attached to the flange 54 by bolts 56.

A steering mechanism 57 comprises a hydraulic cylinder 58 which is attached to the rear lower portion of the rear frame 29. The cylinder 58 has a piston rod 59 projecting from its opposite ends. The rod 59 has connected to its opposite ends the respective ends of a chain 60 reeved around the sprocket 55. Accordingly, lateral reciprocating movement of the piston rod 59 of the cylinder 58 causes the chain 60 and the sprocket 55 to rotate the outer cylinder 32 about the vertical axis of the inner cylinder 31 to steer the rear wheels 9 between a forwardly directed position and a laterally directed position (through an angle of about 90 degrees). Guide sprockets 61 are positioned at opposite sides of the rear portion of the sprocket 55 and mounted on the rear frame 29 for holding the chain 60 reeved around the sprocket 55.

A step support frame 62 projecting forward from the vehicle body 1 is provided with a step plate 63. Indicated at 64 is a steering wheel post, at 65 a steering wheel, and at 66 a steering control unit coupled to the wheel 65 for controlling the hydraulic cylinder 58. A floor cover 67 provided on the vehicle body 1 covers the pulleys 11, 12, etc. The vehicle body is further provided with an operator's seat 68, front wheel fenders 69 and a safety frame 70. The steering wheel 65 and the operator's seat 68, which constitute steering means, are provided in the vicinity of the front wheels 6 at the front portion of the vehicle body 1. More specifically, the steering wheel 65 and the seat 68 are disposed approximately at the midportion between the pair of front wheels 6, in front and rear of the front axle 5, respectively.

A mower 71 has three disks 74 rotatable on vertical shafts 73 under a mower deck 72. Cutter blades 75 are movably pivoted to each disk 74. The rotation of the disks 74 causes the cutter blades 75 to cut grass. The mower deck 72 has cutting level adjusting gauge wheels 76 and limit gauges 77, is connected to the front end of the vehicle body 1 by two links 78 extending forward from the body 1 and is vertically movable by the contraction or extension of a hydraulic cylinder 79. The disks 73 are driven by the power delivered thereto from the front PTO shaft 25 via a universal joint 80.

A clipping container 81 is mounted on the rear frame 29 and attached to posts 82 extending upright from the rear portion of the vehicle body 1. The container 81 is made of a punched metal sheet, netting or the like. The clippings cut off by the mower 71 are transferred to the container 81 through a duct 83, which is connected to the rear central portion of the mower deck 72, extends under the front axle 5 to behind one of the front wheels 6 and is connected to the container 81. Indicated at 84 is a fuel tank.

For mowing, the disks 74 of the mower 71 are drivingly rotated by the power delivered thereto from the crankshaft 10 of the engine 3 via the PTO pulley 12, belt 28, front PTO shaft 25 and universal joint 80 for the cutter blades 75 to cut grass or vegetation. The clippings are collected in the container 81 through the duct 82.

For running, the power from the engine 3 is subjected to a suitable speed reduction by the speed change unit 4 and then transmitted through the gears 21, 22, transmission shaft 23 and universal joint 39 to the input shaft 35 of the rear wheel drive assembly 7, which in turn drives the rear wheels 9 to propel the vehicle. More specifically, in the drive assembly 7, the power is transmitted from the input shaft 35 to the rear wheel differential gear 46 via the bevel gears 37, 38, bevel pinion shaft 36, bevel pinion 51 and bevel gear 50 to drive the rear wheels 9 through the pair of rear axles 8.

The steering wheel 65, when manipulated for steering, causes the control unit 66 to move the piston rod 59 of the hydraulic cylinder 58 sidewise, rotating the outer cylinder 32 about the vertical axis of the inner cylinder 31 through the chain 60 and the sprocket 55 and thereby turning the rear wheels 9 about a vertical axis toward the steered direction while the wheels 9 are being driven. Thus, the direction of advance of the entire vehicle body 1 can be changed by steering the rear wheels 9 through a small angle in this way. This assures great convenience in cutting grass around trees or shrubs. Although the rear axles 8 themselves are turned about the vertical axis at the midportion between the pair of rear wheels 9 for steering, a sufficiently great steering angle is available since the tread of the rear wheels 9 is small. More specifically, the rear wheels can be steered through 90 degrees from a forwardly directed position to a laterally directed position rightward or leftward.

Figure 6:
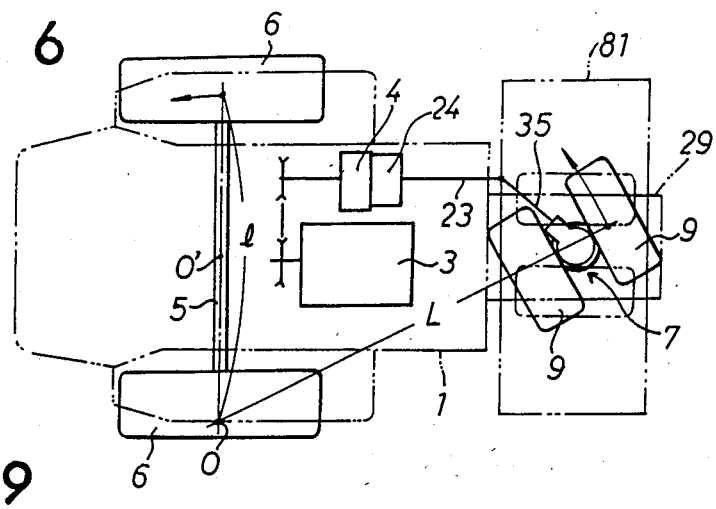

When the rear wheels 9 are steered through an angle $\alpha$ for turning, the vehicle body can be turned about the point of intersection, O, of a phantom extension line of the front axle 5 with a phantom extension line of the rear axles 8 as seen in FIG. 6. At this time, the turning radius $l$ of the front wheel 6 is smaller than the turning radius L of the rear wheel 9. However, the front wheels 6 are freely rotatable, while the rear wheels 9 only are driven, so that the difference in the radius does not cause slippage of the front wheels 6, permitting the vehicle to turn smoothly.

When the rear wheels 9 are steered through about 90 degrees to the laterally directed position, the rear wheels 9 advance laterally, causing the opposed front wheels 6 to rotate in directions opposite to each other, with the result that the vehicle turns about the midportion between the front wheels 6, i.e. the central portion of the steering assembly, as the center O' of turning. Accordingly, the vehicle can make a quick turn with a small radius by being steered with the front wheels 6 in idle rotation and with the rear wheels 9 driven, hence great convenience in mowing grass or the like around trees or shrubs with the mower 70 at the front end of the vehicle body 1. With the center of turning, O', at the center of the steering assembly, the vehicle turns about the operator when making a quick turn with a small radius. This obviates the likelihood of a great centrifugal force acting on the operator, consequently permitting the operator to retain a stable posture and ensuring greatly improved safety during turning.

Although the front wheels 6 of the present embodiment serve as freely rotatable wheels, the invention can be embodied similarly if the front wheels 6 are adapted to be driven through a front wheel differential gear at all times or only when the vehicle is advanced straight.

FIGS. 7 to 13 show a second embodiment of the invention, which comprises a shifter clutch 85 incorporated in a power transmission system for front wheels 6, and means 86 for detecting the steering angle of rear wheels 9, such that the steering angle of the rear wheels 9, when exceeding a predetermined angle $\alpha$, is detected by the means 86 to cause coupling means 87 to disengage the shifter clutch 85.

Figure 9:
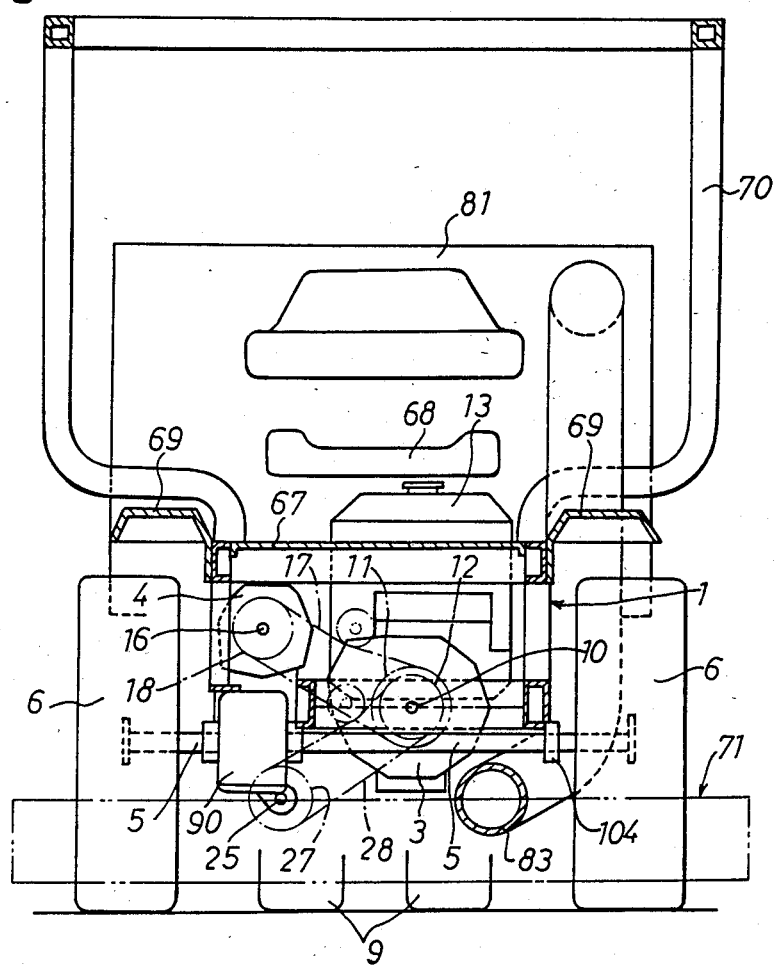
Figure 7:
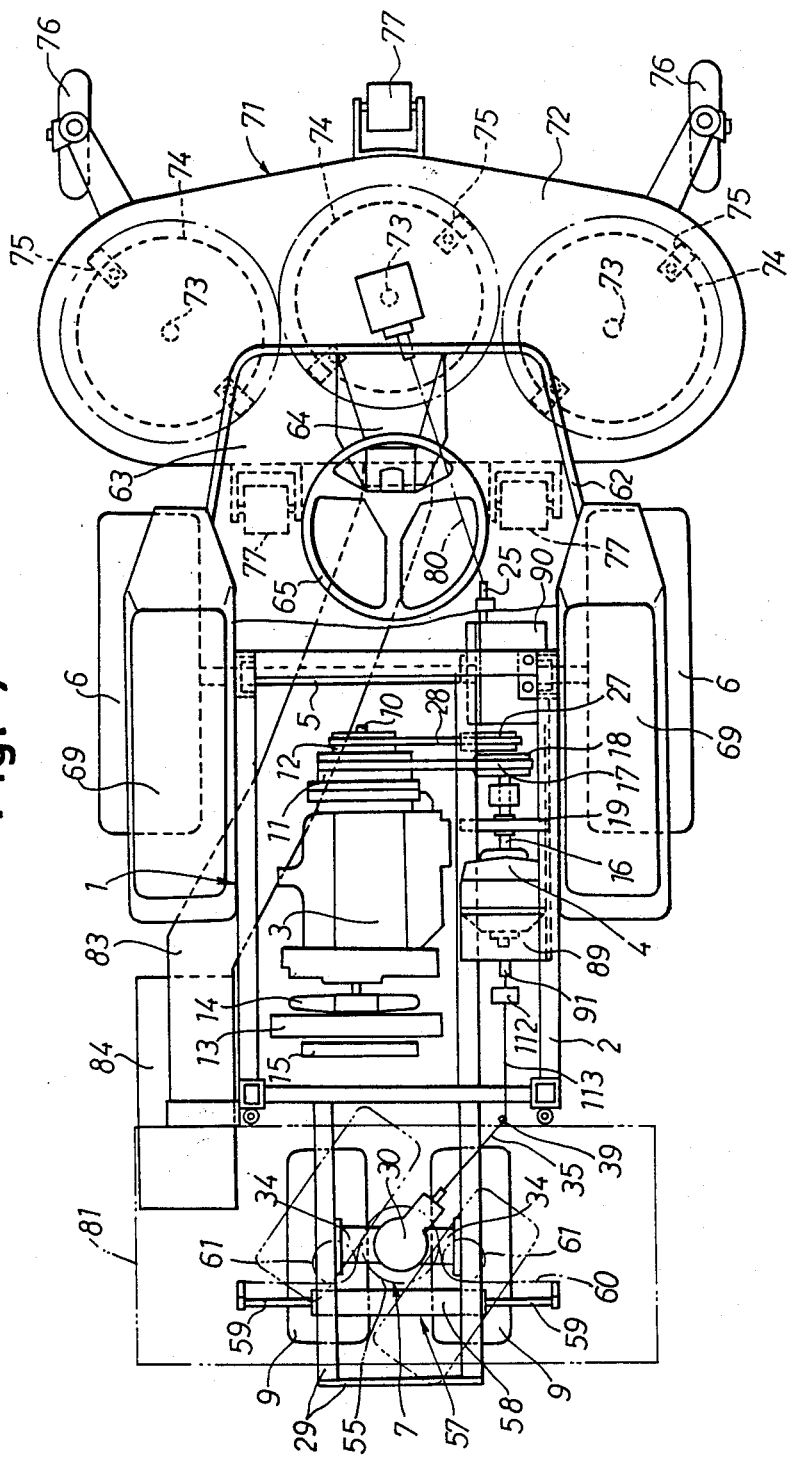
Figure 8:
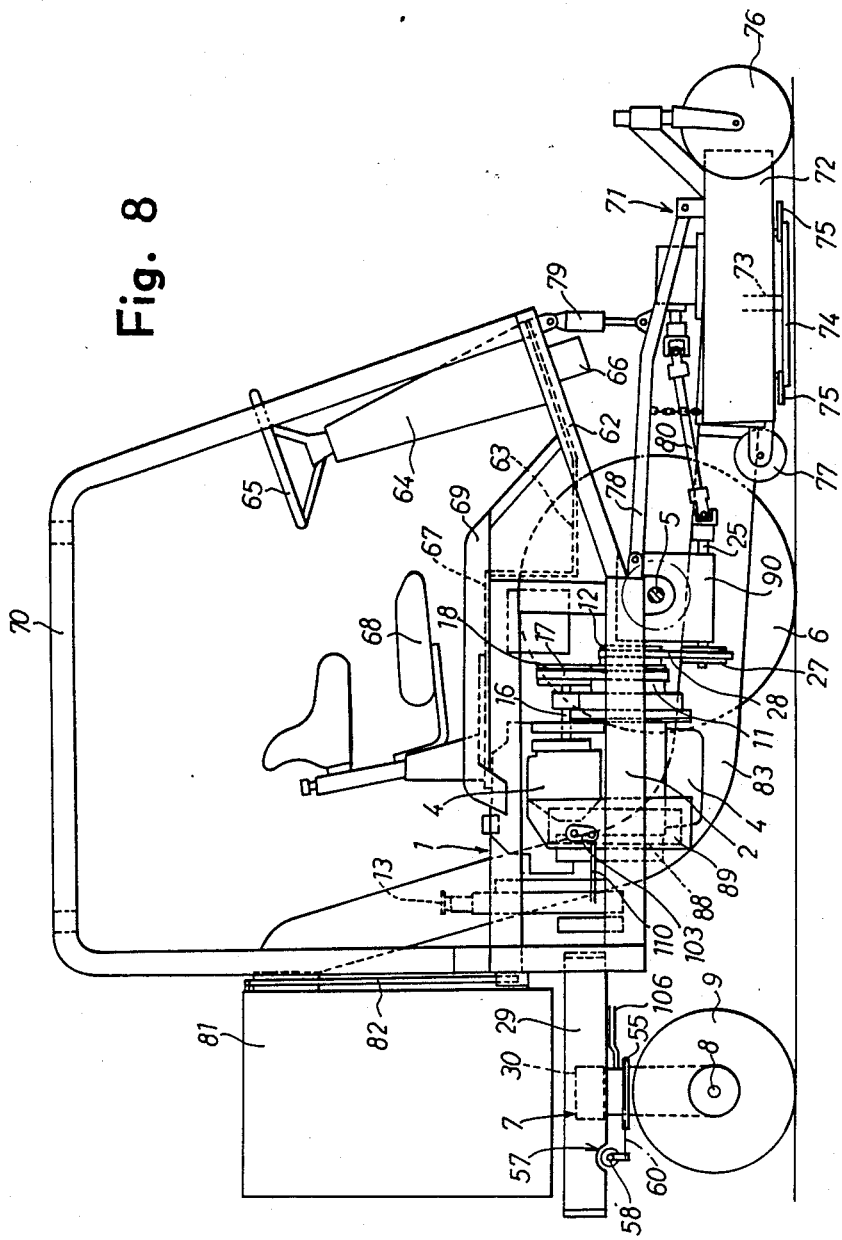

With reference to FIGS. 7 to 9, a speed change unit 4 is provided on its rear side with a downwardly projecting reduction case 89 housing a reduction assembly 88. The reduction case 89 transmits power to the pair of front wheels 6 through a front wheel differential gear 90 and to the pair of rear wheels 9 via a rear wheel drive assembly 7.

Figure 10:
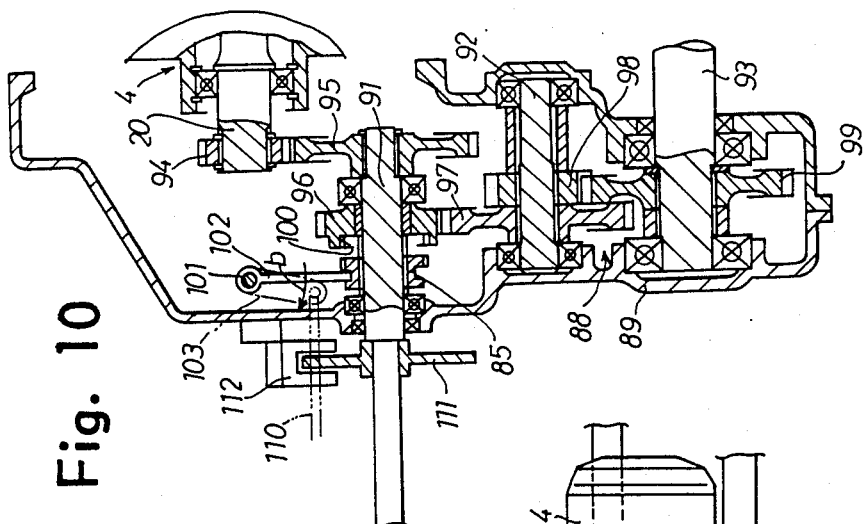

With reference to FIG. 10, the reduction assembly 85 comprises first to third shafts 91, 92, 93 arranged below and parallel to the output shaft 20 of the speed change unit 4. The first shaft 91 is projected rearward from the reduction case 89 for driving the rear wheels, while the third shaft 93 is projected forward from the case 89 for driving the front wheels. The first shaft 91 is coupled to the output shaft 20 of the unit 4 by gears 94, 95 for a speed reduction, the second shaft 92 to the first shaft 91 by gears 96, 97, and the third shaft 93 to the second shaft 92 by gears 98, 99. Accordingly, the output speed of the output shaft 20 reduces from shaft to shaft downward. The gear 96 on the first shaft 91 is freely rotatable and is releasably operatively connectable to the first shaft 91 by the engagement of the shifter clutch 85 with a meshing portion 100. The shifter clutch 85 is engageable and disengageable by a change-over lever 103 through a lever shaft 101 inserted in and supported by the case 89 and a shifting fork 102 at the inner end of the shaft.

The third shaft 93, which has a larger diameter than the first and second shafts 91, 92, extends forward under the speed change unit 4 and meshes at its forward end with a bevel gear of the front wheel differential gear 90.

With reference to FIGS. 7 to 9, the front wheel differential gear 90 is positioned in front of the unit 4 and attached to the lower side of the vehicle body 1. The gear 90 is positioned at one side of the body 1 at a large distance from the widthwise midportion thereof for driving the front wheels 6 with the power delivered thereto from the third shaft 93 via a pair of front axles 5. Since the differential gear 90 is positioned at one side, the longer front axle 5 is supported by a bearing 104 on the vehicle body 1. A PTO shaft 25 is inserted through the case of the gear 90 longitudinally of the vehicle body and has at its rear end a pulley 27 coupled to a PTO pulley 12 by a belt 28.

Figure 11:
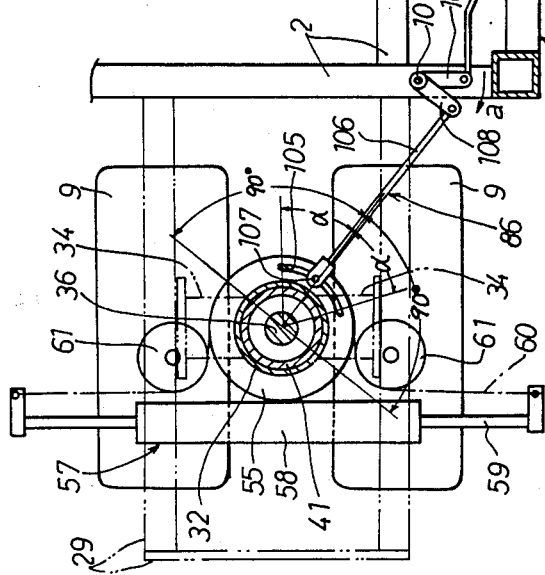
Figure 12:
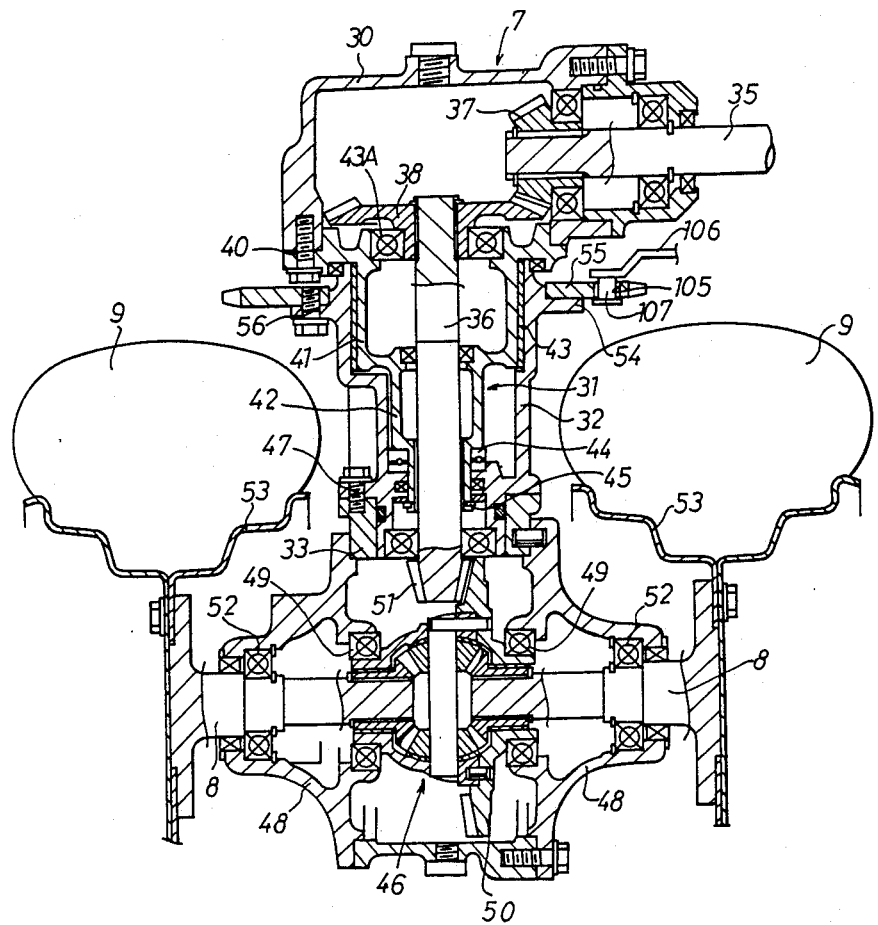

With reference to FIGS. 11 and 12, a sprocket 55 is formed with a slot 105 centered about a bevel pinion shaft 36. A sensor rod 106 has at its one end a pin 107 which is slidably inserted in the slot 105. As seen in FIG. 11, the other end of the sensor rod 106 is connected to a lever 108 supported by a pivot 107' on the vehicle body 1. The slot 105, sensor rod 106, pin 107, lever 108, etc. provide the means 86 for detecting the steering angle of the rear wheels 9. The lever 108 is connected to the change-over lever 103 by the coupling means 87 which comprises a lever 109 fixed to the pivot 107' and a rod 110. When the detecting means 86 detects a steering angle exceeding the predetermined angle α, the shifter clutch 85 is disengaged by the coupling means 87 to interrupt the power transmission to the power transmission system for the front wheels 6. With reference to FIG. 13, the predetermined steering angle α is so determined that the turning radius L of the outer rear wheel 9 is slightly larger than the turning radius l of the outer front wheel 6 as measured from its center of turning O.

The first shaft 91 is provided with a brake 112 comprising a disk 111.

For running, the power delivered from the engine 3 and subjected to a suitable speed change by the unit 4 drives the front wheels 6 via the third shaft 93 of the reduction assembly 88, the front wheel differential gear 90 and the front axles 5. The power is also transmitted from the first shaft 91 of the reduction assembly 88 through a universal joint 39 to the input shaft 35 of the rear wheel drive assembly 7, which in turn drives the rear wheels 9. Since the front wheels 6 have a larger diameter than the rear wheels 9, the power for the front wheels is subjected to a sufficient reduction by the gears 94 to 99 of the reduction assembly 88 and then transmitted to the front wheel differential gear 90 via the third shaft 93 as a high torque of low speed, and the third shaft 93 has a large diameter. On the other hand, the power for the rear wheels 9 is subjected to a reduction only by the gears 94, 95 and delivered from the first shaft 91 as a low torque of high speed. Accordingly, the first shaft 91 has a small diameter.

In the rear wheel drive assembly 7, the power is transmitted from input shaft 35 to rear wheel differential gear 46 via bevel pinion shaft 36, bevel pinion 51 and bevel gear 50 to drive the rear wheels 9 through the rear axles 8. During straight running, the rear wheels 9 are greater than the front wheels 6 in the number of revolutions by a value corresponding to the difference therebetween in diameter, but the front and rear wheels are driven approximately at the same peripheral speed.

The steering wheel 65, when manipulated for steering, causes the control unit 66 to move the piston rod 59 of the hydraulic cylinder 58 sidewise of the vehicle, rotating the outer cylinder 32 around the inner cylinder 31 through the chain 60 and sprocket 55 and turning the rear wheels 9 in the steered direction while the wheels 9 are being driven.

When the rear wheels 9 are steered through an angle not greater than the predetermined angle α, the pin 107 merely slides along the slot 105 of the sprocket 55, with the sensor rod 106, etc. held out of detecting operation. When the rear wheels 9 are steered through an angle exceeding the angle α, the pin 107 comes into engagement with one end of the slotted portion 105, pulling the sensor rod 106. This turns the levers 108, 109 about the pivot 107' in the direction of arrow a shown in FIG. 11, causing the rod 110 to move the lever 103 and the shifting fork 102 about the lever shaft 101 in the direction of arrow b in FIG. 10 and thereby causing the shifter clutch 85 to disengage from the meshing portion 100 of the gear 96. Consequently, the power transmission to the front wheels 6 is interrupted, permitting the rear wheels 9 only to be driven for turning. The vehicle can therefore be turned quickly and smoothly with both the front and rear wheels 6, 9 precluded from slipping. The front wheels 6 are no longer given power and therefore will not advance greatly, so that if the rear wheels 9 are steered through a large angle, the vehicle can be turned about a center positioned in the vicinity of the inner front wheel 6 or between the two front wheels 6. This enables the vehicle to make a quick turn with a small turning radius.

The detecting means 86 and the coupling means 87 can be electric means.

FIGS. 14 and 15 show a third embodiment of the invention. These drawings show a steering mechanism 57 which comprises upper and lower two sprockets 114, 115 fixed to the upper end of the outer cylinder 32, and two chains 116, 117 reeved around the sprockets 114, 115 respectively and each having one end attached to the piston rod 59 and the other end fastened to the sprocket by a member 118 (119).

Alternatively, the outer cylinder 32 may be provided at its upper end with an arm so as to be rotatable by the hydraulic cylinder 58 through the arm.

FIGS. 16 to 27 show a fourth embodiment of the invention, which comprises a front wheel power transmission system 120 and a rear wheel power transmission system 121 for transmitting power to the front wheels 6 and the rear wheels 9, respectively, to give a higher peripheral speed to the front wheels 6 than to the rear wheels 9. The transmission systems 120, 121 are operatively connected to the engine 3 via a no-spin differential 122.

Figure 17:
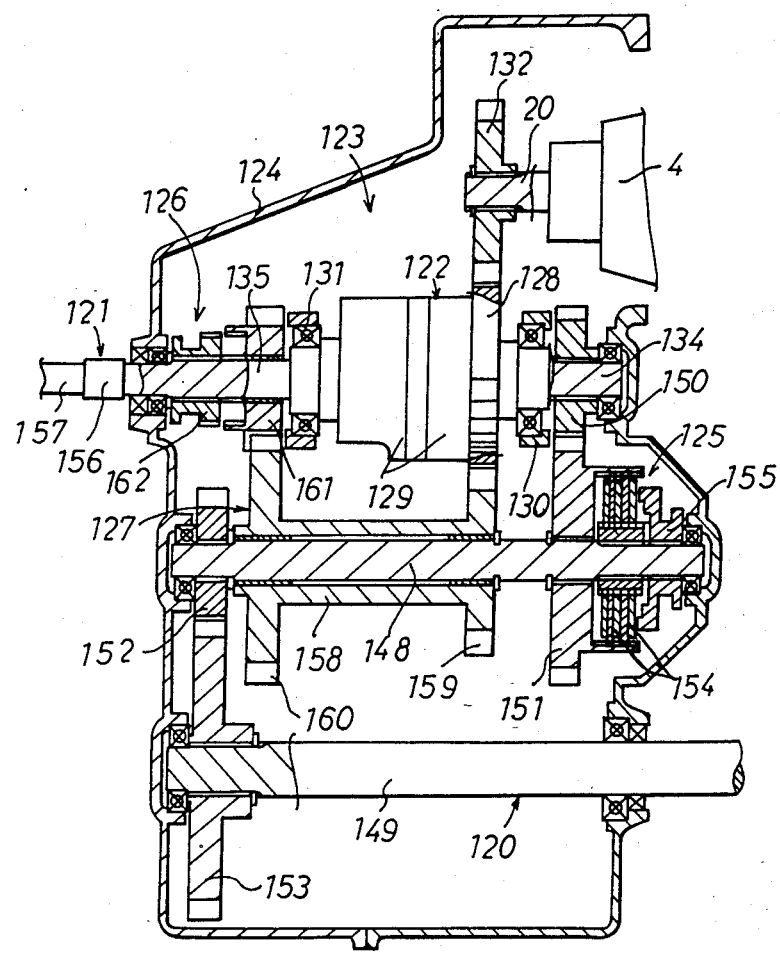

With reference to FIGS. 16 and 17, the speed change unit 4 is provided on its rear side with a vertically projecting transmission case 124 housing a power transmission 123, which comprises the transmission systems 120, 121, the no-spin differential 122, a front wheel clutch 125, a rear wheel clutch 126, an acceleration mechanism 127, etc.

The no-spin differential 122 has a differential case 129 having a gear 128 around its outer periphery. The case 129 is rotatably supported by front and rear bearings 130, 131 on the transmission case 124. The gear 128 is in mesh with a gear 132 fixed to the output shaft 20 of the speed change unit 4.

Figure 18:
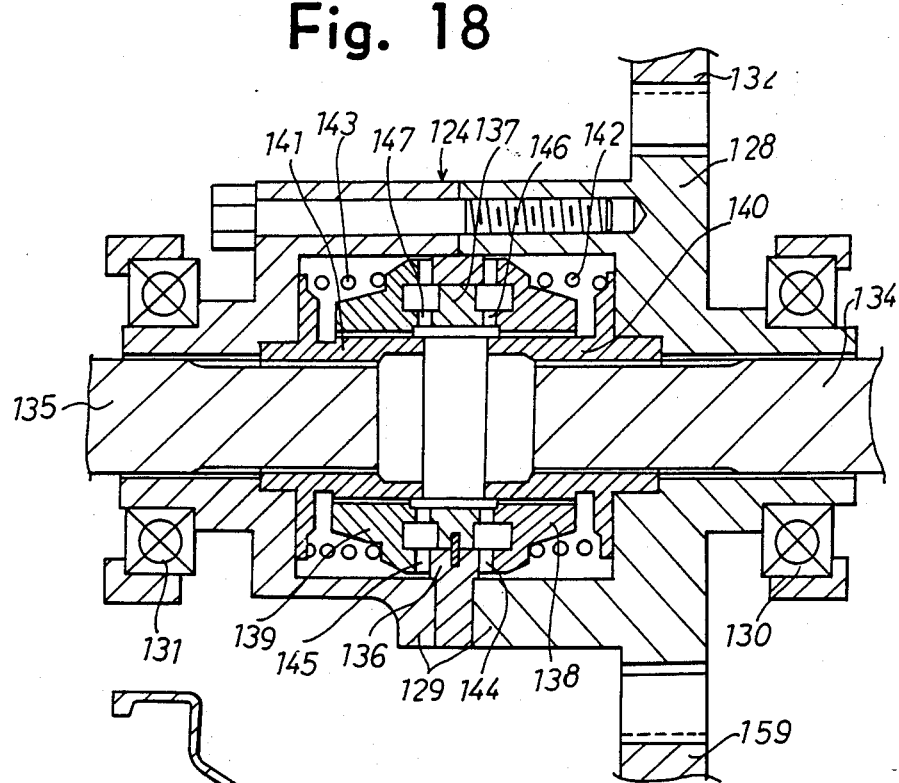

As seen in FIG. 18, the no-spin differential 122 comprises, as housed in the differential case 129, a pair of differential output shafts 134, 135 projecting forward and rearward respectively, a drive ring 136, a cam ring 137, a pair of clutch rings 138, 139, a pair of differential hubs 140, 141, and a pair of springs 142, 143. The drive ring 136 is secured to the case 129. The drive ring 136 is interposed between the pair of clutch rings 138, 139, and these rings 136, 138, 139 are formed on their opposed inner faces with meshing portions or teeth 144, 145 as seen in FIG. 19. The cam ring 137 is secured to the inner periphery of the drive ring 136. The cam ring 137 and the pair of clutch rings 138, 139 are formed on their opposed inner faces with cam teeth 146, 147 as shown in FIG. 20. The clutch rings 138, 139 are slidably splined to the differential hubs 140, 141, respectively, and the hubs 140, 141 to the differential output shafts 134, 135, respectively. The clutch rings 138, 139 are biased toward the cam ring 137 by the springs 142, 143, respectively.

The front wheel power transmission system 120 comprises an intermediate shaft 148 below the no-spin differential 122, a front wheel drive shaft 149 disposed below and in parallel to the shaft 148, a gear 150 fixed to the differential output shaft 134, a gear 151 freely rotatably mounted on the intermediate shaft 148 and meshing with the gear 150, gears 152, 153 fixedly mounted on the intermediate shaft 148 and the drive shaft 149, respectively and meshing with each other, etc. The drive shaft 149 extends forward below the speed change unit 4 and has a front end coupled to the front wheel differential gear 90. The gear 151, which is freely rotatable on the intermediate shaft 148, is operatively connectable to or releasable from the shaft 148 by the front wheel clutch 125. The front wheel clutch 125 is of the friction type having a multiplicity of disks 154 and engageable by a shifter 155.

The rear wheel power transmission system 121 has a transmission shaft 157 connected to the differential output shaft 135 by a coupling 156 and to the input shaft 35 of the rear wheel drive assembly 7. The acceleration mechanism 127 comprises an acceleration gear 158 rotatably fitted around the intermediate shaft 148 and having at its opposite ends gear portions 159, 160, which are respectively in mesh with the gear 128 secured to the no-spin differential 122 and a gear 161 idly rotatably mounted on the differential output shaft 135. The gears 128, 159, as well as the gears 160, 161, give an increased speed. The gear 161 is operatively connectable to the differential output shaft 135 by a shifter 162 of the rear wheel clutch 126.

Figure 26:
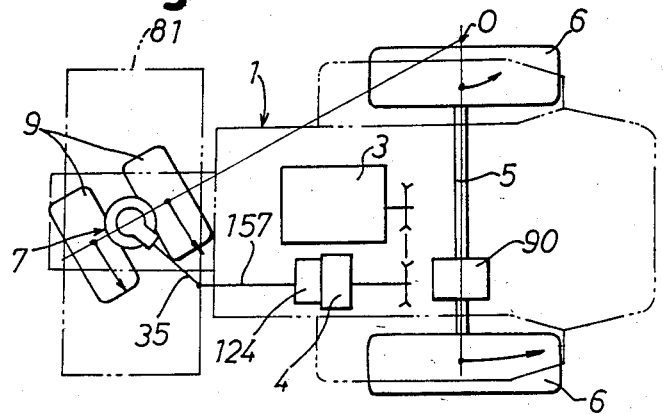

The front wheel clutch 125 is disengaged and the rear wheel clutch 126 is engaged through detecting means 86 and coupling means 87 when the steering angle of the rear wheels 9 exceeds a predetermined angle $\beta$ (about 60 degrees). To describe the coupling means 87 more specifically with reference to FIGS. 16 and 21, the lever 109 is connected to shifting forks 168, 169 of the clutches 125, 126 through rod 110, lever 163, lever shaft 164, link 165 and rods 166, 167. The shifters 155, 162 are movable by the shifting forks 168, 169, respectively. The lever 163 and the link 165 are secured to the lever shaft 164, while the shifting forks 168, 169 are supported by lever shafts 170, 171. With reference to FIG. 26, the steering angle $\beta$ is so determined that the center O of turning is positioned close to the outer side of the front wheel 6.

For straight running, the power from the engine 3 is subjected to a suitable speed change by the unit 4 and then transmitted to the front wheels 6 via the no-spin differential 122, differential output shaft 134, gears 150, 151, front wheel clutch 125, intermediate shaft 148, gears 152, 153, front wheel drive shaft 149 and front wheel differential gear 90 to drive the front wheels 6 of larger diameter as indicated by arrows in FIG. 24. At this time, the rear wheels 9 are free to rotate. More specifically, the peripheral speed of the rear wheels 9 as driven by the rear wheel power transmission system 121 is about 9/10 of the peripheral speed of the front wheels 6, so that the frictional contact of the rear wheels 9 with the ground conversely drives the wheels 9 at the same peripheral speed as the front wheels 6 to rotate the differential output shaft 135 of the no-spin differential 122 at an increased speed. Consequently, the clutch ring 139 is released from the cam ring 137 at their opposed cam teeth 147 as seen in FIG. 23 and is therefore disengaged from the drive ring 136 as seen in FIG. 22. Thus, no power is transmitted to the differential output shaft 135.

If the front wheels 6 slip during straight running, the running speed decreases to decrease the peripheral speed of the rear wheels 9. When the peripheral speed of the rear wheels 9 drops to about 9/10 of the peripheral speed of the front wheels 6, the clutch ring 139 slidingly shifts toward the drive ring 136 by being pushed by the spring 143 to come into meshing engagement with the drive ring 136 at the opposed teeth 145, whereby the power is transmitted also to the differential output shaft 135. The drive force of both the front and rear wheels 6, 9 now drives the vehicle to promptly eliminate the slippage of the front wheels 6. When the slippage is remedied, the front wheels 6 only drive the vehicle again. With the rear wheel drive assembly 7, the power is transmitted from the input shaft 35 to the rear wheel differential gear 46 via the bevel gears 37, 38, bevel pinion shaft 36, bevel pinion 51 and bevel gear 50, causing the rear axles 8 to drive the rear wheels 9.

Figure 25:
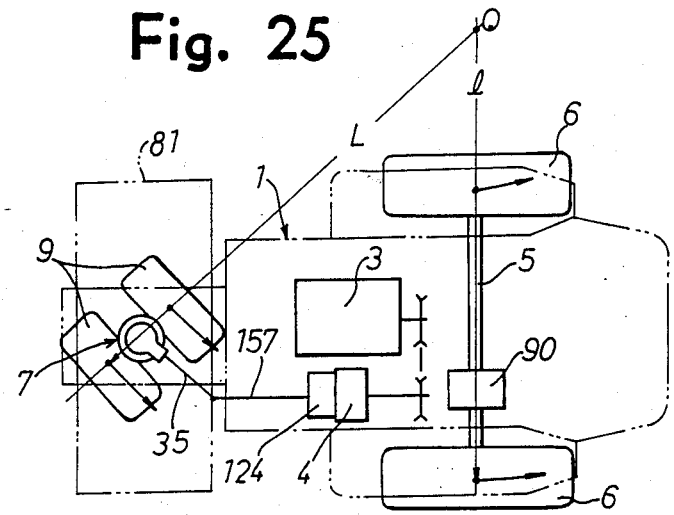

The steering wheel 65, when manipulated for steering, causes the control unit 66 to move the piston rod 59 of the hydraulic cylinder 58 transversely of the vehicle, rotating the outer cylinder 32 around the inner cylinder 31 through the chain 60 and sprocket 55 and turning the rear wheels 9 toward the steered direction while the wheels 9 are left free to rotate. Consequently, the vehicle turns quickly despite the difference between the front and rear wheels 6, 9 in turning radius as measured from the center of turning, O (l<L), as seen in FIG. 25.

When the rear wheels 9 are steered through an angle not greater than the predetermined angle β, the pin 107 merely slides along the slot 105 of the sprocket 55, with the sensor rod 106, etc. held out of detecting operation. When the rear wheels 9 are steered through an angle exceeding the angle β, with the center of turning, O, positioned close to the outer side of the front wheel 6 as seen in FIG. 26, the pin 107 comes into engagement with one end of the slotted portion 105, pulling the sensor rod 106. This causes the rod 110 to turn the lever 163 and the link 165 clockwise (direction of arrow c shown in FIG. 21) about the lever shaft 164. Consequently, the rod 166 turns the shifting fork 168 counterclockwise (direction of arrow d in FIG. 21) about the lever shaft 170 to disengage the front wheel clutch 125, while the rod 167 turns the shifting fork 169 clockwise (direction of arrow e in FIG. 21) about the lever shaft 171 to engage the rear wheel clutch 126. As a result, the power transmission to the front wheels 6 is interrupted, rendering the wheels 6 free to rotate. With the rear wheel clutch 126 engaged, power is transmitted to the transmission shaft 157 via the gears 128, 159 and the acceleration mechanism 127 including the gear 158 with the gear portion 160 and the gear 161, causing the rear wheels 9 to turn the vehicle. The speed increase ration afforded by the acceleration mechanism 127 is about 2 times so as not to greatly change the peripheral speed of the rear wheels 9 upon engagement of the rear wheel clutch 9. At this time, the center of turning, O, is positioned close to the outer side of the front wheel 6, permitting the vehicle to turn with a small radius.

Figure 27:
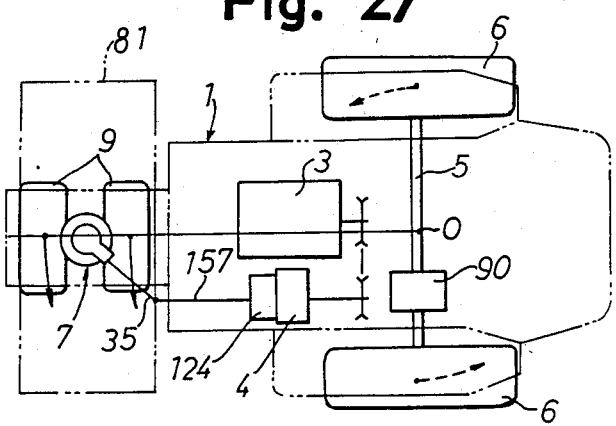

When the rear wheels 9 are steered through 90 degrees, the center of turning, O, is positioned at the midportion between the pair of front wheels 6 as seen in FIG. 27, with the front wheels 6 rotated in opposite directions through the front wheel differential gear 90, so that the vehicle can make a quick turn about the center O.

Since the no-spin differential 122 is used also for straight running or turning during reverse travel, the components function and operate in the same manner as for forward travel.

The detecting means 86 and coupling means 87 may be electric means. The front wheel clutch 125 only may be operatively connected to the coupling means 87, with the rear wheel clutch 126 made engageable or disengageable manually.

What is claimed is:

1. A working vehicle including a vehicle body having a pair of front wheels and a pair of rear wheels, steering means mounted on the vehicle body, and a working machine provided at the front end of the vehicle body, at least the rear wheels of the four wheels being drivingly rotatable and steerable, the working vehicle being characterized in that the steering means is disposed in the vicinity of the front wheels at the front portion of the vehicle body, the rear wheels being steerable between a forwardly directed position and a laterally directed position about a vertical axis approximately at the midportion between a pair of rear wheels, and a front wheel differential is provided between the pair of front wheels, and the pair of front wheels are driven through the differential.

2. A working vehicle including a vehicle body having a pair of front wheels and a pair of rear wheels, steering means mounted on the vehicle body, and a working machine provided at the front end of the vehicle body, at least the rear wheels of the four wheels being drivingly rotatable and steerable, the working vehicle being characterized in that the steering means is disposed in the vicinity of the front wheels at the front portion of the vehicle body, the rear wheels being steerable between a forwardly directed position and a laterally directed position about a vertical axis approximately at the midportion between a pair of rear wheels, and the vehicle further comprises a clutch incorporated in a power transmission system for the front wheels, means for detecting the steering angle of the rear wheels, and coupling means movable with the detecting means to disengage the clutch when the steering angle of the rear wheels exceeds a predetermined angle.

3. A working vehicle as defined in claim 2 wherein the pair of rear wheels are steerable between a forwardly directed position and a laterally directed position about a vertical axis approximately at the midportion between the rear wheels.

4. A working vehicle as defined in claim 2, wherein a rear wheel drive assembly is provided for driving the pair of rear wheels about rear axles, and the rear wheels are steerable about the axis of a vertical shaft of the drive assembly.

5. A working vehicle as defined in claim 4 wherein the rear wheel drive assembly comprises an upper case mounted on the vehicle body and housing a gear mechanism, for coupling an input shaft to a downwardly projecting bevel pinion shaft, an inner cylinder attached to the lower side of the upper case and concentric with the bevel pinion shaft, a lower case housing a differential for transmitting power from the bevel pinion shaft to the pair of rear wheels, and an outer cylinder provided on the upper side of the lower case and fitted around the inner cylinder rotatably about the axis thereof.

6. A working vehicle as defined in claim 4 or 5 wherein the pair of rear wheels are disposed at opposite sides of the rear wheel drive assembly in proximity thereto.

7. A working vehicle as defined in claim 5 wherein a steering mechanism for rotating the outer cylinder is provided at the upper end of the outer cylinder above and close to the rear wheels.

8. A working vehicle as defined in claim 7 wherein the steering mechanism comprises a sprocket fixed to the outer cylinder, a chain reeved around the sprocket and a hydraulic cylinder for driving the chain.

9. A working vehicle as defined in claim 2 wherein the steering means, is provided approximately at the midportion between the pair of front wheels and disposed above front axles for supporting the front wheels 6.

10. A working vehicle as defined in claim 2 or 9 wherein the steering means comprises a steering wheel and an operator's seat which are disposed at the front and rear sides of the front axles respectively.

11. A working vehicle as defined in claim 2 wherein the clutch is provided in the initial reduction step of a reduction assembly incorporated in the power transmission system for the front wheels.

12. A working vehicle as defined in claim 2 wherein the detecting means comprises a lever pivotally movable with the sprocket of the steering mechanism.

13. A working vehicle as defined in claim 2 or 12 wherein the detecting means comprises a sensor rod having at its one end a pin slidably inserted in a slot formed in the sprocket concentrically therewith, and the other end of the sensor rod is connected to the lever pivoted to a stationary member.

14. A working vehicle including a vehicle body having a pair of front wheels and a pair of rear wheels, steering means mounted on the vehicle body, and a working machine provided at the front end of the vehicle body, at least the rear wheels of the four wheels being drivingly rotatable and steerable, the working vehicle being characterized in that the steering means is disposed in the vicinity of the front wheels at the front portion of the vehicle body, the rear wheels being steerable between a forwardly directed position and a laterally directed position about a vertical axis approximately at the midportion between a pair of rear wheels, and
the vehicle further comprises a front wheel power transmission system and a rear wheel power transmission system for transmitting power to the front wheels and the rear wheels respectively to give a higher peripheral speed to the front wheels than to the rear wheels, and the power transmission systems are operatively connected to a prime mover via a no-spin differential.

15. A working vehicle as defined in claim 14 wherein the front wheels have a larger diameter than the rear wheels, and the tread between the front wheels is greater than the tread between the rear wheels.

16. A working vehicle as defined in claim 14 wherein the no-spin differential comprises differential output shafts, respectively projecting forward and rearward from a differential case, and a gear provided around the differential case and operatively connected to a speed change unit, and the forwardly projecting output shaft and the rearwardly projecting output shaft are operatively connected to the front wheel power transmission system and the rear wheel power transmission system respectively.

17. A working vehicle as defined in claim 14 which further comprises a front wheel clutch included in the front wheel power transmission system, and means for detecting the steering angle of the rear wheels to disengage the front wheel clutch when the angle detected exceeds a predetermined angle $\beta$.

18. A working vehicle as defined in claim 17 wherein the front wheel clutch is disengaged when the rear wheels are so steered that the center O of turning is inward of a position close to the outer side of the front wheel.

19. A working vehicle as defined in claim 17 wherein an acceleration mechanism and a rear wheel clutch for bring the mechanism into or out of operation are provided between the gear of the no-spin differential and the differential output shaft.

20. A working vehicle as defined in claim 19 wherein the acceleration mechanism includes an acceleration gear freely rotatably mounted on a shaft of the front wheel power transmission system.

21. A working vehicle as defined in claim 19 wherein the front wheel clutch of the front wheel power transmission system and the rear wheel clutch of the rear wheel power transmission system are reversely operatively connectable to each other.

22. A working vehicle as defined in claim 14 wherein a rear wheel drive assembly is provided for driving the pair of rear wheels about rear axles 8, and the rear wheels are steerable about the axis of a vertical shaft of the drive assembly.

23. A working vehicle as defined in claim 22 wherein the rear wheel drive assembly comprises an upper case mounted on the vehicle body and housing a gear mechanism, for coupling an input shaft to a downwardly projecting bevel pinion shaft, an inner cylinder attached to the lower side of the upper case and concentric with the bevel pinion shaft, a lower case housing a differential for transmitting power from the bevel pinion shaft to the pair of rear wheels, and an outer cylinder provided on the upper side of the lower case and fitted around the inner cylinder rotatably about the axis thereof.

24. A working vehicle as defined in claim 22 or 23 wherein the pair of rear wheels are disposed at opposite sides of the rear wheel drive assembly in proximity thereto.

25. A working vehicle as defined in claim 23 wherein a steering mechanism for rotating the outer cylinder is provided at the upper end of the outer cylinder above and close to the rear wheels.

26. A working vehicle as defined in claim 25 wherein the steering mechanism comprises a sprocket fixed to the outer cylinder, a chain reeved around the sprocket and a hydraulic cylinder for driving the chain.

27. A working vehicle as defined in claim 14 wherein the steering means is provided approximately at the midportion between the pair of front wheels and disposed above front axles for supporting the front wheels.

28. A working vehicle as defined in claim 14 or 27 wherein the steering means comprises a steering wheel and an operator's seat which are disposed at the front and rear sides of the front axles respectively.

29. A working vehicle as defined in claim 14 wherein the pair of rear wheels are steerable between a forwardly directed position and a laterally directed position about a vertical axis approximately at the midportion between the rear wheels.

30. A working vehicle as defined in claim 17 wherein the detecting means comprises a lever pivotally movable with the sprocket of the steering mechanism.

31. A working vehicle as defined in claim 17 wherein the detecting means comprises a sensor rod having at its one end a pin slidably inserted in a slot formed in the sprocket concentrically therewith, and the other end of the sensor rod is connected to the lever pivoted to a stationary member.

* * * * *